United States Patent [19]

Weisbrich

[11] 4,156,579
[45] May 29, 1979

[54] TOROIDAL ACCELERATOR ROTOR PLATFORM

[76] Inventor: Alfred L. Weisbrich, 76 Mayflower Rd., Windsor, Conn. 06095

[21] Appl. No.: 763,936

[22] Filed: Feb. 25, 1977

Related U.S. Application Data

[63] Continuation-in-part of Ser. No. 523,028, Nov. 12, 1974, Pat. No. 4,021,140.

[51] Int. Cl.² ............................................. F03D 3/04
[52] U.S. Cl. ......................................................... 415/2
[58] Field of Search .......................................... 415/2–4

[56] References Cited

U.S. PATENT DOCUMENTS

| | | | |
|---|---|---|---|
| 3,339,078 | 8/1967 | Crompton | 415/2 X |
| 4,021,135 | 5/1977 | Pedersen et al. | 415/2 |
| 4,021,140 | 5/1977 | Weisbrich | 416/117 |

FOREIGN PATENT DOCUMENTS

| | | | |
|---|---|---|---|
| 359555 | 9/1922 | Fed. Rep. of Germany | 415/2 |
| 935673 | 6/1948 | France | 415/2 |
| 973968 | 2/1951 | France | 415/4 |
| 977561 | 4/1951 | France | 415/2 |
| 1011132 | 6/1952 | France | 415/4 |
| 59852 | 8/1954 | France | 415/2 |

Primary Examiner—Everette A. Powell, Jr.

[57] ABSTRACT

A fluid flow accelerator structure which is substantially the shape of an interior section of a hollow toroid of general arbitrary cross-section in both vertical and horizontal planes, meaning that in both a vertical and horizontal plane a cross-section may be non-circular, and circumventing an axis central to said toroid, providing fluid flow channel means about the exterior periphery of said structure, and wherein fluid impact impellers are mounted within said fluid flow accelerator channel means in regions of optimum flow velocity for optimum energy recovery, and said fluid flow accelerator is further provided with partial shroud shell means on parts of its periphery and therewith completely circumventing projected actuator discs of said impact impellers, about an axis substantially perpendicular to said actuator discs, in complement with said peripheral channel means. The invention is contemplated for use in conjunction with electric generators or power generating systems in general capable of utilizing power output from said impact impellers operating on said fluid flow accelerator structure. The omnidirectional fluid flow accelerator referenced in the former application above shall hence forth be referred to as a Toroidal Accelerator Rotor Platform or TARP in acronym form.

9 Claims, 6 Drawing Figures

TOROIDAL ACCELERATOR ROTOR PLATFORM

BACKGROUND OF THE INVENTION

This application is a continuation-in-part application of the VARIABLE GEOMETRY WINDTURBINE & PLANAR OMNIDIRECTIONAL FLOW ACCELERATOR application, Ser. No. 523,028, filed 11/12/1974 now U.S. Pat. No. 4,021,140 dated 3 May 1977.

1. Field of the Invention

The present invention is concerned with power generation and, more particularly, to fluid flow streamtube capture and flow acceleration means to fluid impact impellers providing a substantially rotational output in response to said fluid flow relative to the impact impellers. The invention is contemplated for use in connection with electric power generators or power generating systems in general capable of utilizing said rotational power output from the impact impellers.

2. Description of the Prior Art

Turbine impact impellers of various designs and configurations for providing a rotational output in response to fluid flow are well known in the art. However, prior art impeller impact turbines are limited in their effectiveness by unmodified ambient fluid velocity impacting them.

The present invention provides accelerated fluid flow fields to the actuator discs of impact impeller turbines mounted within peripheral channel means of the TARP invention, being a fluid flow accelerator structure, being substantially the shape of an interior section of a hollow toroid of general arbitrary cross-section in both vertical and horizontal planes, meaning that in a horizontal plane the cross-section may be non-circular, and is further provided with partial shroud shell means on parts of its periphery, thereby structurally completing circumvention of the projected actuator discs of said impact impellers about an axis substantially perpendicular to said actuator discs in complement with said peripheral channel means.

It is thus an object of the present invention to accelerate fluid flow in velocity from ambient velocity onto projected actuator discs of impact impellers situated substantially within said peripheral channel means of a TARP and provide improved fluid streamtube capture via partial shroud shell means at the actuator discs of said impact impellers.

It is a further object of the present invention to structurally circumvent and contain said accelerated flow at the projected actuator discs of said impact impellers between said peripheral channel means and shroud shell means, said circumvention being about an axis substantially perpendicular to said actuator discs.

It is another object of the present invention to alleviate tip losses of impact impellers by enshroudment, enhance fluid flow uniformity, extract added energy by larger fluid streamtube capture, and improve environmental protection of impact impellers and associated equipment.

SUMMARY OF THE INVENTION

The present invention concerns a fluid flow accelerator structure, referred to in acronym form as a TARP, being substantially the shape of an interior section of a hollow toroid of general arbitrary cross-section in both vertical and horizontal planes, meaning that in both a horizontal and vertical plane a cross-section may be non-circular, providing fluid flow channel means about the exterior periphery of said structure, and wherein fluid impact impellers are mounted substantially within said peripheral channel means at points of optimum flow velocity, and whereby said fluid flow accelerator is further provided with partial shroud shell means on parts of its periphery thereby structurally completing circumvention of the projected actuator discs of said impact impellers about an axis substantially perpendicular to said actuator discs in complement with said peripheral channel means.

DESCRIPTION OF THE PREFERRED EMBODIMENTS

Figure 1:
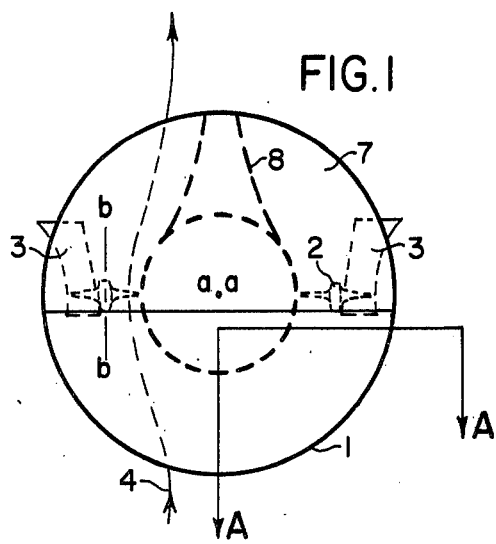
FIG. 1 shows a top view of one preferred embodiment of the present invention.
Figure 3:
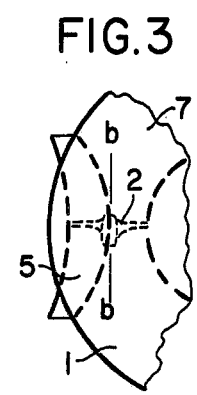
FIG. 3 and FIG. 5 show top views of alternative preferred embodiments of a partial shroud shell means and illustrated on a sectional portion from the TARP structure.
Figure 2:
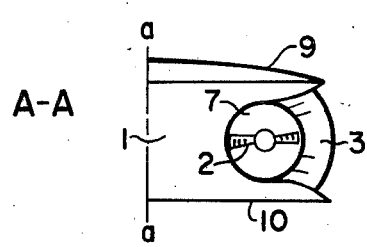
FIG. 2 shows a sectional front view of preferred embodiment in FIG. 1.
Figure 4:
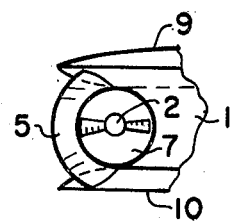
FIG. 4 and FIG. 6 show front views of sectionally illustrated preferred embodiments of FIG. 3 and FIG. 5, respectively.
Figure 5:
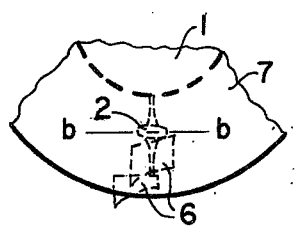
Figure 6:
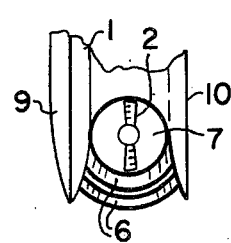

Referring to FIG. 1 and FIG. 2, a Toroidal Accelerator Rotor Platform, TARP, 1 illustrates incorporation of rotatable impact impellers 2 within open fluid flow channel means 7 about the periphery of said TARP and said impact impellers 2 being located substantially at optimum flow field points within said peripheral channel means. Referring to FIG. 1 and FIG. 2, and sectional views of a TARP 1 in FIGS. 3, 4, 5, & 6, said peripheral fluid flow channel means are illustrated completely circumvented about part of a TARP periphery by various adaptable partial shroud shell means 3, 5, or 6 of a substantially divergent, convergent-divergent, or multi-concentric divergent duct section shape in FIGS. 1 & 2, FIGS. 3 & 4, and FIGS. 5 & 6, respectively, about an axis bb, substantially perpendicular to an impact impeller projected actuator disc area. The TARP structure may rotate about an axis as in response to directionally shifting fluid flow and thereby maintain projected actuator discs of impact impellers 2 in position with respect to augmented fluid flow for optimum energy extraction. A flow blockage structure or obstruction device 8 to flow situated within TARP peripheral channel means 7 is provided for substantially aiding TARP yawing or weathervaning means, TARP profile drag reduction and, together with roof scoop structure 9 and base floor structure 10, for flow inducement means about a TARP. Another preferred embodiment allows interconnected rotatable impact impellers 2 together with partial shroud shell means of type 3, 5, or 6 to revolve about a stationary TARP structure within and about said TARP peripheral channel means in response to directionally shifting fluid flow. FIG. 7 and FIG. 8 illustrate rotatable impact impellers 2 to be vertical axis rotors unlike the horizontal axis rotors illustrated in FIGS. 1, 2, 3, 4, 5 and 6 for impact impellers 2.

Various modifications, embodiments and changes will be evident while still remaining within the scope and spirit of the invention.

What I claim is:

1. A power generating device comprising; fluid impact impellers for converting fluid flow energy into mechanical energy; a fluid flow accelerator structure being substantially the shape of an interior section of a hollow toroid of general arbitrary cross-section in both vertical and horizontal planes; meaning that in both a vertical and horizontal plane the cross-section may be other than circular, circumventing an axis central to said toroid, providing open fluid flow channel means and defining augmented flow velocity regions about the exterior periphery of said structure, and wherein rotatable fluid impact impellers are mounted in the augmented flow velocity regions within said peripheral channel means for maximum energy recovery; partial shroud shell means mounted to the fluid flow accelerator on part of its periphery to structurally complete circumventing each projected actuator disc of said impact impellers in complement with said peripheral channel means and about an axis substantially perpendicular to said projected actuator discs whereby additional energy output by said impact impellers via larger fluid streamtube capture occurs.

2. A power generating device according to claim 1, wherein said partial shroud shell means and rotatable impact impellers are rigidly mounted to and remain fixed with respect to said fluid flow accelerator structure and wherein said fluid flow accelerator structure may rotate about a central axis in response to directionally shifting fluid flow into position for maximum energy extraction by said rotatable impact impellers.

3. A power generating device according to claim 1, having a substantially circular horizontal cross-section for said fluid flow accelerator structure, wherein said partial shroud shell means together with interconnected rotatable impact impellers may revolve in response to directionally shifting fluid flow, with respect to said fixed fluid flow accelerator structure within and about the latter's peripheral channel means, into position for optimum energy extraction by said impact impellers.

4. A power generating device according to claim 2, wherein said fluid impact impellers comprise two horizontal axis rotors.

5. A power generating device according to claim 3, wherein said fluid impact impellers comprise two horizontal axis rotors.

6. A power generating device according to claim 1 wherein each said partial shroud shell means is comprised of substantially a radial section of a convergent-divergent type duct.

7. A power generating device according to claim 1 wherein each said partial shroud shell means is comprised of substantially a radial section of a divergent diffuser type duct.

8. A power generating device according to claim 1 wherein each said partial shroud shell is comprised of substantially a radial section of a concentric multi-stage divergent diffuser type duct.

9. A power generating device according to claim 7 wherein said impact impellers comprise two horizontal axis rotors.

* * * * *